United States Patent Office 2,875,674
Patented Mar. 3, 1959

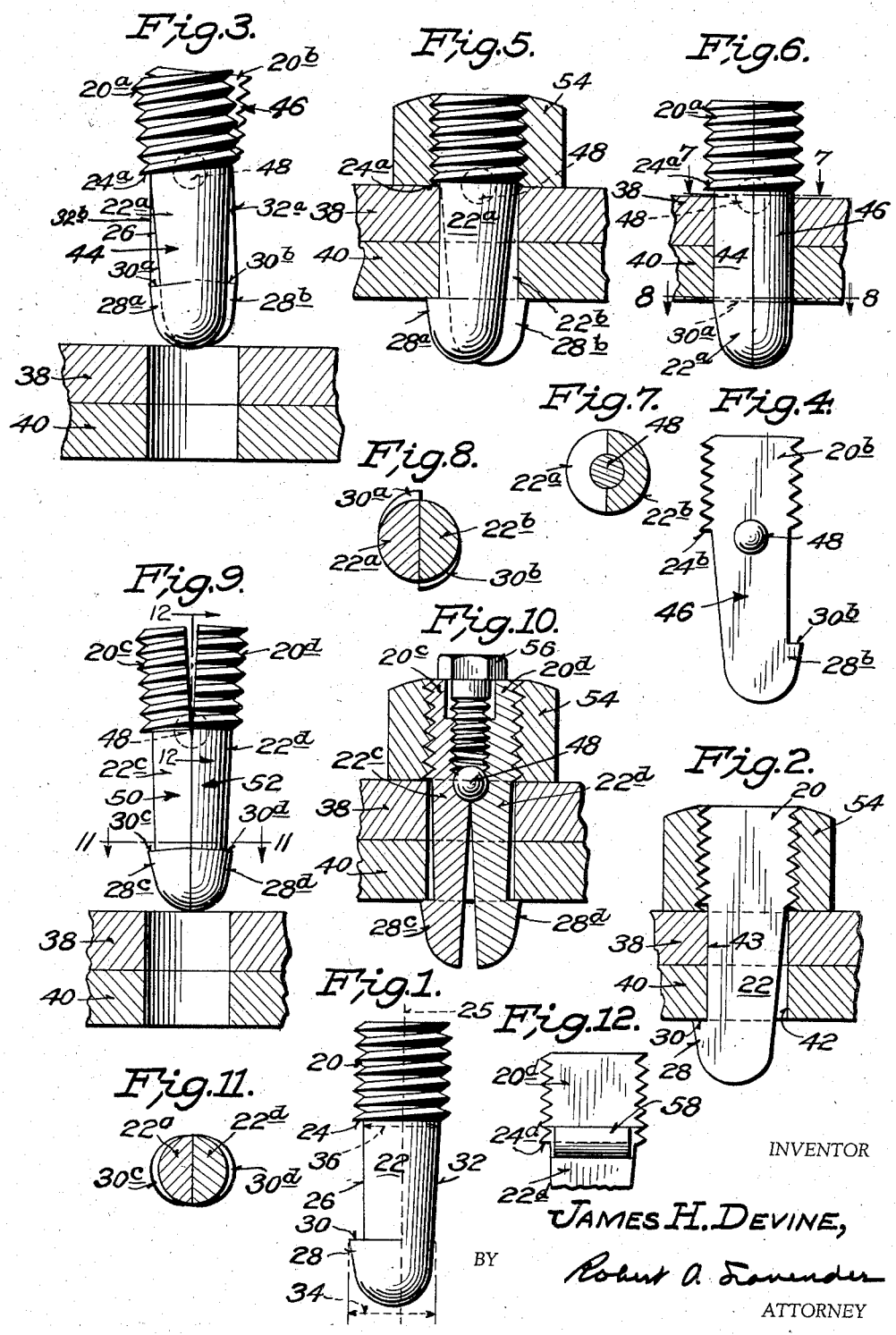

2,875,674

BLIND BOLT WITH PIVOTING LEDGE

James H. Devine, Washington, D. C.

Application August 9, 1951, Serial No. 241,029

11 Claims. (Cl. 85—1)

This invention relates generally to bolts and more particularly to blind bolts, that is, bolts that are used to secure one material to another when access is not had to one of the bolt contacting faces of one of the materials, such as the back surface of a wall.

The use of blind bolts has been generally restricted in the past to securing together sheets of thin material, such as stove pipe sections or other thin sheet metal objects, the thinness of the metal making it impractical to cut threads in the thin sheets. In such cases, a divided or sectional bolt was inserted through the aligned holes in the materials either as a unit, such as shown in U. S. patent to Kennedy, No. 551,931 (1895), or in sections, such as shown in U. S. patents to Kling, No. 1,055,330 (1913) and No. 1,075,980 (1913). In the first cited Kling patent, of which the second patent is a continuation in part, the bolts shown in Figures 1 and 4 are limited in their use to thicknesses of the materials to be secured together "approximately equal to one half the diameter of the bolt" (page 2, lines 77 et seq.) This limitation is present because the right side bolt section 2, as shown in Figures 1 and 2, would jamb against the rim of the hole in sheet 3 were sheet 3 any thicker. When a second material, such as wood strip 7 (Figure 2) is placed over sheet 3, it was found necessary to hold the aligned bolt sections by some means, until the strip was put in place and the nut 5 was screwed on, otherwise the bolt would slip through the lower plate. This difficulty was overcome by providing a special auxiliary nut 8 (Figure 8) to hold the bolt steady until the wood strip 7 could be put in place. This procedure was not only expensive as to materials, but also expensive as to labor.

Kennedy in his patent provided a pivot between the bolt sections, with the shanks bent at right angles to the threaded portions and a shoulder at the base of the threaded portion. However, the relation of the position of the shoulders to the pivot point and the relation of the pivot point to the 90 degree bends in the shanks of the Kennedy "Pipe Fastener," limited its use to such thin sheet metal constructions as stove pipes.

Other typical types of blind bolts are shown in U. S. patent to Wales, No. 2,352,207, Dedering Patent No. 11,672 (Sweden 1900) and Knechter Patent No. 405,203 (British). In none of these patents are there shoulders on the bolt shank or between the shank and the threaded head or pivots in divided bolts for permitting relative angular movement and preventing relative movement of the bolt sections in their collapsed condition for inserting the bolt as a unit into a deep hole. The Dedering patent shows lugs for preventing relative lateral movement of the sections when the bolt is only in its expanded or inserted condition.

These disadvantages of the prior art have been overcome in the present invention which for convenience will be described and claimed as applied to securing together two horizontal plates. It will be understood, however, that the invention is not limited to any position of the materials to be bolted together, to any thicknesses of materials, to any ratios of thickness of materials to the diameter of the bolts, or to the number of plates or pieces of materials to be bolted together.

The invention consists of a bolt, either solid or consisting of complementary parts, that includes a threaded head and a shank portion extending axially therefrom, the cross-sectional area of the shank being less at the juncture of the threaded head and the shank to form undercut or overhanging ledge surfaces in the planes common to the heads and shanks, the said ledges being adapted to engage the upper rim of the hole in the upper of the two plates to prevent the bolt from dropping or passing through the holes in the plates to be secured together. For convenience and clarity in this specification and in the appended claims, these undercut or overhanging ledge surfaces are defined by the single word "ledges." One longitudinal part of the shank extends at right angles to the ledge and from the inner edge thereof, and on this one part of the shank is positioned a toe that is distant from the ledge substantially the thickness of the materials to be secured together. The other part of the shank extends from the inner edge of the ledge and is tapered longitudinally to the shank to a position beyond the transverse plane of the toe. The taper is such that the greatest dimension of the toe and shank in the plane of the toe is substantially the diameter of the shank at the ledge. This permits the bolt to pass into a hole limited in length only by the length of the shank.

As the ledge of the bolt contacts the rim of the hole in the upper plate (known hereinafter as the "exposed surface"), the bolt pivots on the ledge and is seated on the first or upper plate. As the part of the shank that extends at right angles to the ledge carries the toe, the toe is moved into contact position with the rim of the hole in the rear face of the second or lower plate (known hereinafter as the "blind surface"). It is thus made possible to quickly drop a number of bolts into a series aligned holes however deep, when securing one plate on another plate without danger of the bolts falling or passing through the holes. Furthermore, when a bolt is placed in two holes of such plates, the two strips are held in loose contact with each other by the toes contacting the back of the lower plate, thus assuring the continued alignment of all the holes in the plates. The securing nuts for tightening the plates together may be put on later.

When the bolt of this invention consists of two complementary sections, the construction of the individual sections is the same as the solid bolt. In such an arrangement, the toes are positioned on the longitudinal part of the shank that extends at right angles from the ledge, and the other part of the shank portion is similarly tapered. The two sections are pivoted together in the planes of the ledges of the sections. This permits the two sections to pivot one on the other when the shoulders contact the rim of the hole in the upper plate and thereby move the toes into contact position with the rim of the hole in the rear face of the lower plate. The pivot also prevents relative lateral and longitudinal movement of the sections before the ledges are seated on the surface of the upper plate. The two sections of the bolt, therefore, drop or are inserted into the hole in the plates as a unit.

In the practice of this invention it is as easy to remove the bolt as it is to install it. The tightening nut is removed and either the head of the solid bolt is tilted or the heads of the bolt sections are moved relative to each other, thus moving the toe or toes out of contact with the back face of the lower plate. The bolt may then be easily removed from the holes in the plates.

It will be noted that the ledges have two functions that are made possible by the relation of their position to other parts of the bolt: the ledges (1) act as a pivot point for the bolt or bolt sections to move to bring the toe or toes into operative position with the rim of the hole in the lower face of the lower plate and (2) act as a reference plane for the location of the bearing between the two sections of the bolt.

Also, it will be noted that the bearing pivot between the two sections has two functions that are made possible by its location with reference to other parts of the bolt: (1) the pivot permits the component parts to change from a collapsed condition to an expanded condition as the sections pivot about the ledges and thus move the toes into positional engagement with the rim of the hole in the lower plate; and (2) the pivot prevents relative lateral and longitudinal movement of the sections while the bolt is being inserted in the hole.

The principal object of the invention is to provide a bolt that may be used to secure two plates together when access is not had to the rear face of one of the plates.

Another object of the invention is to provide a blind bolt that may be of unlimited length and thickness.

Another object of the invention is to provide a blind bolt the shank of which may freely enter and pass through a hole limited in depth only by the length of the shank.

Another object of the invention is to provide a bolt that seats itself and thereby moves itself to a tightening readiness condition, without other force than that exerted by is own weight.

Another object of the invention is to provide a bolt that consists of two sections pivoted one on the other to align the sections of the bolt while it is being inserted into a hole and to prevent relative lateral and longitudinal movements of the sections while being inserted and after insertion into a hole.

Another object of the invention is to provide a blind bolt in which ledges on the bolt cooperate with the rim of the hole in which the bolt is inserted, to prevent the bolt from passing through the hole and for moving flat surfaces on the shank of the bolt into cooperative position with the rim of the hole on an inaccessible surface.

Another object of the invention is to provide a blind bolt that does not require any holding or steadying means when two plates are being secured together.

Another object of the invention is to provide a blind bolt that can be easily and quickly removed.

A further and specific object of the invention is to provide a unitary solid bolt of the character described that is adapted to be formed from rod or reel stock of uniform and minimum diameter for the bolt size required.

Other objects will be obvious from the description of the inventions given herein and from the drawings made a part thereof in which:

Figure 1 is a side view of one embodiment of the invention in which the bolt is shown as a solid unit;

Figure 2 is a side view of the bolt in Figure 1 shown in a tightened condition, securing two plates together;

Figure 3 is a side view of a bolt of another embodiment of the invention showing a bolt in two sections and in its collapsed condition, that is, as it is being dropped or inserted into holes in two plates to be secured together;

Figure 4 is a side view of the rear section of the bolt shown in Figure 3;

Figure 5 is a view of the bolt of Figure 3 in its expanded and secured position, with the bolt sections swung laterally to each other and in contact with the plates being secured together;

Figure 6 is a view of the bolt of Figure 3 taken at right angles to its position in Figure 5;

Figure 7 is a cross-section view taken on line 7—7 of Figure 6;

Figure 8 is a cross-section view taken on line 8—8 of Figure 6;

Figure 9 is a side view of an embodiment of the invention as the bolt is being inserted in holes in two plates, the two sections of the bolt pivoting on each other such that one each of the flat surfaces of the sections pivot toward and away from each other;

Figure 10 is a side view of the bolt of Figure 9 with the sections separated and in contact with the plates to be secured together;

Figure 11 is a cross section view taken on line 11—11 of Figure 9; and

Figure 12 is a partial side view of the right half part of the head and shank of the bolt of Figure 9, taken on line 12—12 of Figure 9, and in which the pivot is a pin or rod.

Referring particularly to Figures 1 and 2, 20 is a threaded head portion of a bolt from the lower side of which extends shank 22. Shank 22 is smaller in cross sectional area than bolt 20 at their juncture, thus forming an undercut or overhanging ledge 24.

One longitudinal part of shank 22 (to the left of the center plane thereof, indicated by broken line 25) extends at right angles from the inner edge of ledge 24, indicated by line 26. At a distance from ledge 24 equal substantially to the thickness of the plates to be secured together, is positioned toe 28. The upper surface 30 of toe 28 is shown as flat and, substantially parallel to ledge 24 and is of a width substantially the width of ledge 24.

The other longitudinal part of shank 22 (to the right of center plane 25) is tapered longitudinally from the inner edge of ledge 24 to a position beyond the plane of surface 30, as indicated by line 32. This taper is at such an angle with the plane of ledge 24 that the greatest dimension of the toe and shank in the plane of surface 30, as indicated at 34, is substantially equal to the inner diameter of ledge 24, as indicated at 36.

While the shank is entering or being inserted into the hole in plates 38 and 40, the right part of shank 22, as indicated by line 32, is in sliding contact with the right part of the hole, as indicated at 42, and the outer edge of toe 28 is in sliding contact with the left part of the hole as indicated at 43.

Referring particularly to Figures 3, 4, 5, 6, 7 and 8, a second embodiment of the invention is shown in which the bolt is composed of two sections with parts and functions of parts the same as the parts and functions of parts of the solid bolt shown in Figures 1 and 2. The two sections will be referred to generally as 44 and 46, respectively, and subscripts a and b will be added to corresponding parts shown in Figures 1 and 2.

The bolt of this embodiment (known as a "slide bolt") consists of threaded head portions 20a and 20b, that are semicircular in cross-section, from which shanks 22a and 22b extend as previously described, each shank with corresponding taper and toes 28a and 28b.

The two sections, 44 and 46, are pivoted about a ball bearing 48 set into the flat faces of sections 44 and 46 and about which bearing the sections 44 and 46 pivot one on the other. The axis of ball 48 is in the planes of shoulders 24a and 24b. Bearing 48 serves the functions of a pivot to permit the bolt to assume a collapsed condition, such as shown in Figure 3 in which condition the bolt may be inserted in holes in plates 38 and 40 and to assume a spread condition, as indicated in Figure 5, in which condition the surfaces 30a and 30b are in contact with the lower surface of plate 40. The bearing also serves the function of keeping the two sections 44 and 46 from moving relative to each other both while the bolt is being inserted as a unit in the hole in plates 38 and after the sections 44 and 46 are seated on plate 38. In practice, the shank of the bolt passes rapidly and freely through the hole in plates 38 and 40 and, when plates 38 and 40 are horizontal, the ledge lands with a click against plate 38 such that the bolt assumes its clamping condition, as shown in Figure 5, without applying any other force, except that due to the weight of the bolt. In practice, the bolt will absorb tension the same as the conventional bolt in proportion to the specific strength of the material bolt and the dimensions of the parts, and the threads and the lateral length and longitudinal depth of the toes 28a and 28b.

Referring particularly to Figures 9, 10 and 11, there is shown therein a third embodiment of the invention similar to the embodiment (known as a "spread" bolt) shown in Figures 3 to 8, inclusive. In this third embodiment, each section, referred to generally as 50 and 52, respectively, consists of threaded portions 20c and 20d, each portion being semi-circular in cross-section with the flat surfaces thereof in contact with each other when the bolt is in a spread condition, as shown in Figure 10. The shank portions are in general the same as previously described in the second embodiment except that the flat surfaces of shank portions are in contact with each other only when the bolt is in a collapsed condition, as shown in Figure 9. To accomplish this, the flat surfaces of shank 22c and 22d are tapered at an angle to the flat surfaces of the threaded head portions 22c and 22d, the flat surfaces of each of sections 50 and 52, respectively, meeting in the axis of ball bearing 48, about which bearing the two sections 50 and 52 pivot.

As previously described for the second embodiment disclosed, the ball bearing 48 in this third embodiment has the identical function of preventing relative motion between the sections 50 and 52. When the bolt is inserted in the holes in plates 38 and 40 and the shoulders 24c and 24d strike the upper surface of plate 38, the force or inertia of the bolt will cause the head portions to pivot on the surface of plate 38 and the sections 50 and 52 to pivot one on the other on bearing 48. These pivotings will move the toes 28c and 28d outward into engagement with the under surface of plate 40, as shown in Figure 10. A nut 54 may then be screwed onto threaded portions 20c and 20d and tension put on the bolt.

It is realized that as tension is put on the bolt by screwing up on nut 54, the plates 38 and 40 may be compressed and the ledges 24c and 24d be raised out of contact with plate 38. The bolt will continue to maintain its spread condition as threaded head portions 20c and 20d cannot separate because of the nut 54 being screwed thereon. Also, the base of the nut will act as ledges for the bolt and the bolt cannot be moved sideways as the diameter of the shank at the level of the surface of plate 38 is substantially the diameter of the holes in plate 38.

It is obvious that the bolt may be used as a stud bolt by boring a hole in the central axial portion of threaded head portions 20c and 20d. Referring to Figure 10, conventional bolt 56 is shown as screwed into internal threads cut in head portions 20c and 20d, by which bolt other plates or materials may be secured to the bolt.

Referring to Figure 12, there is shown therein bar or pin 58 as a substitute pivot for ball 48. A hole is bored through head portions 20c and 20d and shank portion 22c and 22d, such that the axis of the hole passes through the planes of the ledges 24c and 24d. The bearing pin 58 is then inserted in this hole, as a substitute for ball bearing 48. In some cases it may be advantageous to use a pin 58 as a bearing and the ends of the pin may be peened or upset sufficiently to hold the two sections of the bolt together as a unit. Pin 58 may likewise be substituted for ball bearing 48 in Figures 3 and 5.

It is also obvious that the three embodiments of the invention may be used as the conventional bolt, when access can be had to the rear faces of both of the materials that it may be desired to secure together. It is also obvious that modifications and changes in physical proportions and locations of parts may be made by those skilled in the art within the scope of the claims appended hereto.

What I claim is:

1. A screw bolt including: a threaded head portion and a shank portion extending axially said head portion; the said shank portion being of less cross-sectional area than said head portion at the juncture of said head portion and said shank portion, whereby a pivot ledge is formed; the said shank portion having one longitudinal part thereof parallel to the axis of said head portion; a toe extending radially said one part of said shank portion and having a flat surface paralleling and facing said ledges; the other longitudinal part of said shank portion being tapered at an angle to said ledge such that the greatest transverse dimension in the plane of said flat surface is substantially equal to the greatest transverse dimension in said shank portion in the plane of said ledge.

2. A screw bolt for insertion through and engagement with an exposed surface and a blind surface adjacent a hole in two plates comprising: a threaded head having a radius greater than the radius of said hole; a shank extending axially from said head having a radius at its juncture with said head substantially the same as the radius of said hole, whereby a pivot ledge is formed for engagement with the said exposed surface of one of said plates; one longitudinal part of said shank being parallel to the axis of said head and having a toe extending laterally therefrom a distance substantially equal to the width of said ledge and having a surface adapted to engage the blind surface; the other longitudinal part of said shank being tapered from said ledge to a point longitudinally beyond said toe surface, such that the greatest transverse dimension in the plane of said toe surface is substantially equal to the greatest transverse dimension in said shank portion in the plane of said ledge whereby the said shank is free to enter said hole and upon the ledge of said head engaging the said exposed surface of said one of said plates, the toe surface on said shank is moved into engagement position with the said blind surface of the other of said plates.

3. A screw bolt for securing together two plates having an aligned hole therethrough comprising: a threaded head portion and a shank portion extending axially therefrom, the said shank portion at the juncture between said head portion and said shank portion being of smaller dimensions than said head portion, whereby a pivot ledge is formed to engage the exposed surface of one of said plates; one longitudinal part of said shank portions being parallel to the axis of said head portion and having a toe extending in width therefrom a distance at least equal to the width of said ledge, the said toe having a flat surface parallel to said ledge positioned to engage a blind surface of the other of the said plates, the other longitudinal part of said shank portion being tapered from said ledge to a position longitudinally beyond said toe surface, the said taper being such that the greatest dimension of said shank portion and said toe in the plane of said toe surface is substantially the diameter of said shank portion at said ledge.

4. A screw bolt comprising: two complementary bolt sections each of said sections having a threaded head portion of semicircular cross-section and having a flat surface, and a shank portion extending axially from said head portion and having a flat surface, the said shank portions being of less maximum cross-sectional dimensions than said head portions, whereby pivot ledges are formed at the junctures of said head and shank portions; means in the planes of said ledges for pivoting said sections one on the other and for preventing relative longitudinal movement motion of said sections when juxtaposed each other; each of said shank portions having a toe offset to one side thereof and in directions opposite to each other relative to the respective longitudinal axes of said shank flat surfaces.

5. A screw bolt comprising: two complementary sections, each section having a flat surface and having a threaded head portion and a shank portion; the said shank portions being of less cross sectional area than said head portions at the junctures of said head and shank portions, whereby pivot ledges are formed; means for pivoting said complementary sections one on the other, the axis of said pivot being in the planes of said section ledges; one longitudinal part of each of said shank portions being at right angles to the planes of said section ledges and having a toe extending laterally therefrom a distance at least the width of said ledges; the other longitudinal part of said shank portions being tapered longitudinally from said ledge to a position beyond said toe, the said taper being such that the greatest transverse dimensions of said shank portions in the planes of said toes are substantially equal to the width of said flat surface of said shank portions at said ledges.

6. A screw bolt comprising: two complementary sections each section having a threaded head portion of semicircular cross section and a shank portion extending axially therefrom; the cross sectional area of said shank portion at said extension being less than the cross section area of said head portion, whereby pivot ledges are formed; the round sides of said shank portions being parallel to the round sides of said head portions and the flat sides of said shank portions being at an angle to the flat sides of said head portions, whereby the said shank portions are longitudinally tapered from the planes of said ledges; means for pivoting said sections one on the other, the axis of said pivot means being in the planes of said ledges; toes extending radially from said round sides of said shank portions in spaced relation to said ledges, the said toes having flat surfaces facing and parallel to said ledges and at least as wide as said ledges; the said taper being such that the longest dimensions of said shank portions at the planes of said toe surfaces are substantially equal to the radius of said shank portions at said ledges.

7. A screw bolt comprising: two complementary sections each section having a threaded head portion of semicircular cross section and a tapered shank portion having a flat surface on one side extending axially therefrom whereby each of said sections have complementary flat surfaces; the cross sectional area of said shank portion being less than the cross section of said head portion, whereby a pivot ledge is formed; the flat surfaces of said shank portions being extensions in the same planes as the flat surfaces of said head portions; one longitudinal part of each of said shank portions and including one edge of said flat surfaces being parallel to the axis of said head portion and the other longitudinal part of each of said shank portions including the other edge of said flat surfaces being tapered toward the free ends of said shank portions; means for pivoting the said sections one on the other, the axis of said pivot means being in the planes of said ledges; toes extending from said one part of said shank portions at right angles to the axes of said shank portions, the said toes extending in relative opposite directions from their respective said one part and said other part of said shank portions.

8. A screw bolt comprising: two complementary sections each section having a threaded head portion of semicircular cross section and a tapered shank portion having a flat surface on one side extending axially therefrom whereby each of said sections have complementary flat surfaces; the cross sectional area of said shank portion at its juncture with said head portion being less than the cross section of said head portion, whereby a pivot ledge is formed; the flat surfaces of said shank portions being extensions in the same planes as the flat surfaces of said head portions; one longitudinal part of each of said shank portions and including one edge of said flat surfaces being parallel to the axis of said head portion and the other longitudinal part of each of said flat surfaces being tapered toward the free ends of said shank portions; means for pivoting the said sections one on the other, the axis of said pivot being in the planes of said ledges; toes extending from said one part of said shank portions at right angles to the axes of said shank portions, the said toes extending in relative opposite directions from their respective said one part and said other part of said shank portions and the said toes having flat surfaces parallel to said ledges; the said taper being such that the longest dimensions of said shank portions in the plane of said toes is substantially equal to the width of the said flat surfaces of said shank portions at said ledges; the flat surfaces of said toes being positioned from said ledges a distance substantially equal to the combined thicknesses material to be bolted together whereby moving contact of said ledges with one face of said materials will move the flat surfaces of said shank portions into contact with the other face of said material and thereby hold said material in compression.

9. A blind bolt adapted to engage an exposed surface and a blind surface composed of complementary sections, each section comprising: a tightening head portion, a shank portion extending from said head portion and of smaller cross section area thereof whereby a pivot ledge is formed adapted to engage said exposed surface; a toe on said shank portion adapted to engage said blind surface; and a pivot within said complementary sections and lying in the plane of said ledges and said exposed surface engaging said complementary sections and pivoting one of said sections on the other.

10. A screw bolt capable of engaging an exposed surface and a blind surface including at least one member comprising: a threaded head portion; a shank portion of lesser cross sectional area extending axially therefrom in such manner as to provide an overhanging pivot ledge at the juncture of said portions, one part of the circumferential surface of said shank portion extending at right angles from said ledge; and a toe extending radially therefrom and facing said ledge in spaced relation, and the other part of said circumferential surface being tapered at an angle to said ledge such that the greatest transverse dimension in the plane of said toe is substantially equal to the greatest transverse dimension in the said shank portion in the plane of said ledge.

11. A screw bolt comprising two separable counterparts each having a threaded head portion of semi-circular cross section and a shank portion of semi-circular cross section and lesser cross-sectional area extending therefrom in such manner as to provide an overhanging pivot ledge at the juncture of said portions, one part of the circumferential surface of each shank portion extending at right angles to its pivot ledge and having a toe extending radially therefrom and facing its pivot ledge in spaced relation, and the other part of the circumferential surface being tapered at an angle to the pivot ledge such that the greatest transverse dimension in the plane of said toe is substantially equal to the greatest transverse dimension in the shank portion in the plane of the pivot ledge; and a pivot member interengaging said counterparts and having its axis substantially in the planes of said ledges.

References Cited in the file of this patent
UNITED STATES PATENTS

| | | |
|---|---|---|
| 551,931 | Kennedy | Dec. 24, 1895 |
| 594,526 | Glauber | Nov. 30, 1897 |
| 1,055,330 | Kling | Mar. 11, 1913 |
| 1,400,364 | Knapik | Dec. 13, 1921 |

FOREIGN PATENTS

| | | |
|---|---|---|
| 175,707 | Great Britain | Mar. 2, 1922 |